R. E. HAMILTON.
TRACTION WHEEL.
APPLICATION FILED DEC. 11, 1914.
1,139,968.
Patented May 18, 1915.
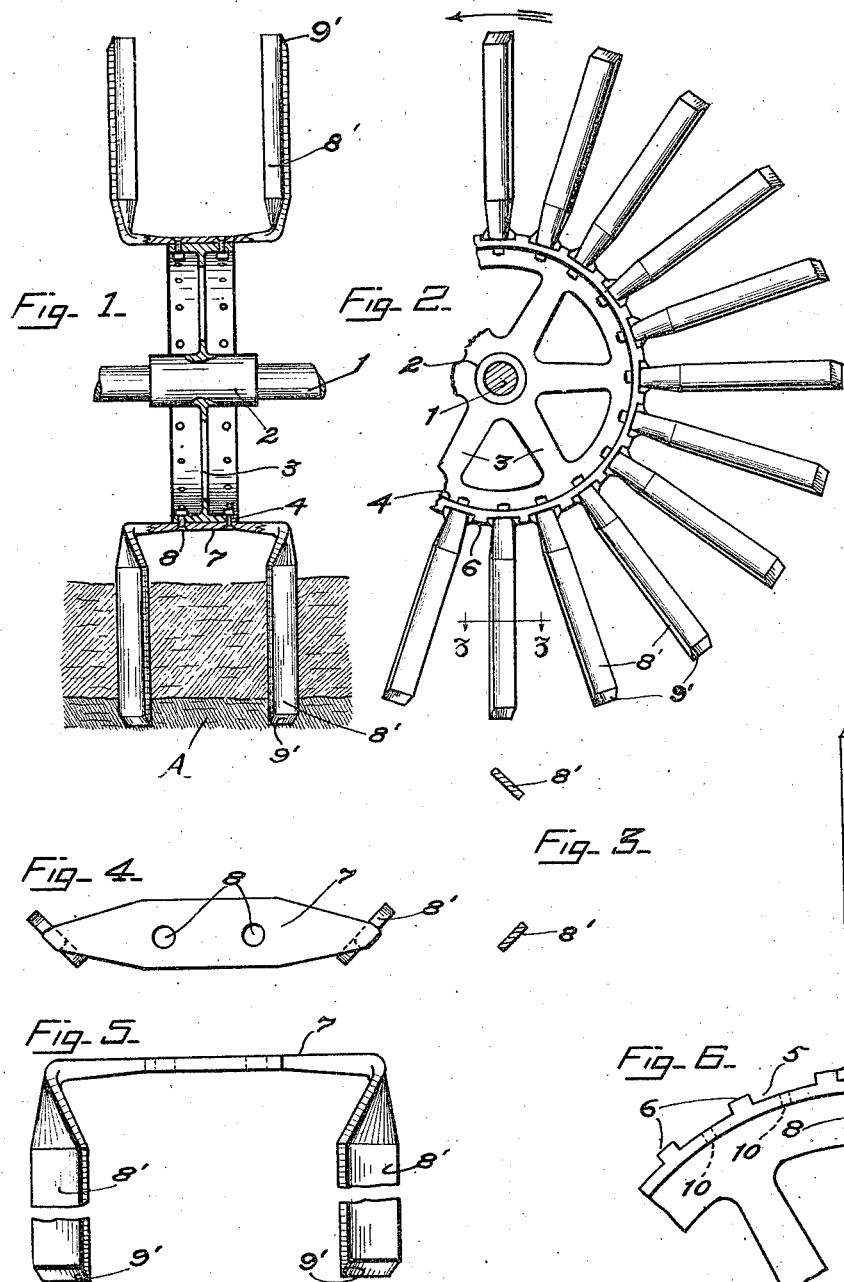

UNITED STATES PATENT OFFICE.

RUSH E. HAMILTON, OF GEYSERVILLE, CALIFORNIA.

TRACTION-WHEEL.

1,139,968. Specification of Letters Patent. Patented May 18, 1915.

Application filed December 11, 1914. Serial No. 876,619.

*To all whom it may concern:*

Be it known that I, RUSH E. HAMILTON, a citizen of the United States, residing at Geyserville, in the county of Sonoma and State of California, have invented certain new and useful Improvements in Traction-Wheels, of which the following is a specification.

The present invention relates to improvements in traction wheels adapted for use in vehicles designed for pulling plows or other agricultural machinery over soft ground.

The invention has for its principal objects to provide a pronged structure capable of attachment to the felly of a wheel, and which will extend through the soft or loose top soil and engage the hard pan or subsoil and provide sufficient traction for the wheel; one designed for loosening the soil as the prongs thereof are caused to leave the soil, owing to the rotation of the wheel, and to provide a structure which will cause the loosened soil to be thrown in a certain direction, thereby forming a furrow in the soil over which the wheel has traveled.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in vertical section with an embodiment of my invention applied thereto. Fig. 2 is a view in side elevation of a wheel disclosing an embodiment of my invention. Fig. 3 is a sectional view taken on line 3—3 of Fig. 3, disclosing the angle of disposition of the blades. Fig. 4 is a top plan view of one of the blades removed from the wheel. Fig. 5 is a view in elevation of a pair of blades. Fig. 6 is a view in side elevation of a portion of a wheel felly with one pair of blades in position.

Referring more particularly to the drawings, wherein like characters of reference designate corresponding parts throughout the several views—1 is a shaft on which is mounted the hub 2 of a wheel having spokes 3 and a felly 4. The felly is formed transversely of its outer surface with the depressions or seats 5 separated from each other by the raised portions 6.

Seated in each of the depressions or seats 5 and extending transversely of the felly and overhanging the edges thereof are the base portions 7 of the traction members, and the same are detachably secured in position on the felly by suitable bolts 8 which extend through openings 9 in the base portion 7 and other suitable openings 10 in the felly.

Formed integral with the ends of the base portion 7 and extending at right angles to the face thereof are the soil engaging blades or prongs 8' which are beveled at their lower ends, as at 9', and said blades or prongs are twisted adjacent to their juncture with the base 7 so that the faces of the main portion of the blades lie at an angle of 45 degrees to a line extending through the longitudinal center of the base, and also be at an angle of 90 degrees to each other.

By forming the faces of the blades at an angle of approximately 45 degrees to the line of travel of the wheel, the lower ends of the blades will obtain a better hold on the hard pan A, as in Fig. 1, and the blades on being raised from the soil, caused by the rotation of the wheel in the direction of the arrow—Fig. 2, will cause the soil to be thrown upwardly and thoroughly loosened to be further acted on by the implement following. The blades are preferably of a length sufficient to extend through the soft top soil and penetrate the hard pan or subsoil, the hardness of the hard pan preventing the deep penetration thereof by the prongs or blades and the length of the prongs or blades maintaining the wheel rim in spaced relation to the top soil, thereby preventing the packing of the same by the wheel, as shown in Fig. 1. If necessary, when the wheel is traveling from place to place over hard roads or ground, the blades may be readily removed by removing the bolts 8.

Having thus described my invention, I claim:—

1. In combination, a wheel, a plurality of tractors detachably secured thereto and each comprising a base member extending transversely of the wheel for the full width thereof and formed at each end with an integral prong, said prongs extending therefrom at substantially right angles to the face of the periphery of the wheel and the faces thereof disposed at an angle to each other.

2. In combination with a wheel formed with transverse depressions extending the full width thereof, a tractor detachably secured in each of said depressions and each comprising a base member extending transversely of the wheel rim and projecting beyond the side edges thereof, a substantially flat prong formed integral with each end of said base member and extending therefrom outwardly at right angles to the periphery of the wheel, the said prongs at the joint with said base being twisted to dispose the faces thereof at an angle to the path of travel of the wheel.

3. A tractor attachment for securing to the tread of a wheel, comprising an inverted substantially U-shaped member formed with a base portion and integral parallel spaced substantially flat faced prong members extending at right angles to the base member, and the faces of said prongs disposed at an angle to each other.

In testimony whereof I have signed my name to this specification in the presence of two subscribing witnesses.

RUSH E. HAMILTON.

Witnesses:
  HARRY H. TOTTEN,
  D. B. RICHARDS.